United States Patent
Fan et al.

(10) Patent No.: US 11,352,161 B2
(45) Date of Patent: Jun. 7, 2022

(54) SYSTEM FOR PLACING A LABEL ON AN OBJECT, A METHOD THEREOF AND AN EFFECTOR FOR A ROBOTIC SYSTEM

(71) Applicant: Hong Kong R&D Centre for Logistics and Supply Chain Management Enabling Technologies Limited, Pok Fu Lam (HK)

(72) Inventors: Ka Lun Fan, Pok Fu Lam (HK); Wai Ming Edwin Cheung, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 0 days.

(21) Appl. No.: 16/346,253

(22) PCT Filed: Nov. 1, 2016

(86) PCT No.: PCT/CN2016/104221
§ 371 (c)(1),
(2) Date: Apr. 30, 2019

(87) PCT Pub. No.: WO2018/081922
PCT Pub. Date: May 11, 2018

(65) Prior Publication Data
US 2020/0071015 A1      Mar. 5, 2020

(51) Int. Cl.
*B65C 9/40*      (2006.01)
*B25J 9/16*      (2006.01)
(Continued)

(52) U.S. Cl.
CPC ............... *B65C 9/40* (2013.01); *B25J 9/1661* (2013.01); *B25J 15/0691* (2013.01);
(Continued)

(58) Field of Classification Search
CPC ......... B65C 1/021; B65C 9/02; B65C 9/1826; B65C 9/1884; B65C 9/26; B65C 9/28;
(Continued)

(56) References Cited

U.S. PATENT DOCUMENTS 5,188,687 A * 2/1993 Baum .................. B65C 9/1865
156/351
5,435,862 A * 7/1995 Williams ................. B65C 1/021
156/277
(Continued)

FOREIGN PATENT DOCUMENTS

CH           682072 A5 * 7/1993  ........... B66C 1/0231
CN         101795950      7/2014
(Continued)

OTHER PUBLICATIONS

Google Patents Translation of JP 2002-308241 A; Inventor Kenji Yoneda; Published Oct. 23, 2002 (Year: 2002).*
(Continued)

*Primary Examiner* — George R Koch
(74) *Attorney, Agent, or Firm* — Renner, Kenner, Greive, Bobak, Taylor & Weber (57) ABSTRACT

A system for placing a label on an object comprising: a scanning module arranged to scan the object for a suitable label placement position based on predefined parameters associated with the label; a robotic controlled apparatus arranged to extract the label from a label substrate and move the label to be adjacent to the suitable label placement position; and, wherein the robotic controlled apparatus is further arranged to apply the label onto the suitable label placement position such that the label is adhere to the object.

23 Claims, 7 Drawing Sheets

(51) Int. Cl.
*B25J 15/06* (2006.01)
*B65C 1/02* (2006.01)
*B65C 9/02* (2006.01)
*B65C 9/26* (2006.01)

(52) U.S. Cl.
CPC ............... *B65C 1/021* (2013.01); *B65C 9/02* (2013.01); *B65C 9/26* (2013.01)

(58) Field of Classification Search
CPC ... B65C 9/40; B65C 2009/401; B65C 9/1876; B25J 15/0691; B25J 9/1661
See application file for complete search history.

(56) References Cited

U.S. PATENT DOCUMENTS 6,668,896 B1 * 12/2003 Granero Tormo ........ B65C 9/28 156/497
2013/0174960 A1 * 7/2013 Goetz ..................... B65C 3/00 156/64
2015/0225104 A1 * 8/2015 Reed ..................... B65B 61/26 347/110
2015/0290812 A1  10/2015 Bottini

FOREIGN PATENT DOCUMENTS

| | | |
|---|---|---|
| CN | 106043872 | 10/2016 |
| CN | 105857813 | 11/2017 |
| EP | 298510 | 5/2012 |
| JP | 4369578 | 11/2009 |
| JP | 2002308241 | 3/2011 |

OTHER PUBLICATIONS

Translation of CH-682072-A5, Koller Hans, Jul. 1993 (Year: 1993).*
Chinese Office Action dated Jul. 21, 2021.

* cited by examiner

SYSTEM FOR PLACING A LABEL ON AN OBJECT, A METHOD THEREOF AND AN EFFECTOR FOR A ROBOTIC SYSTEM

TECHNICAL FIELD

The present invention relates to a system for placing a label on an object, a method thereof, an effector for a robotic system and more particularly, although not exclusively, to a system for placing a label on an object and a method thereof, wherein the attributes of the object is unknown before the object is scanned.

BACKGROUND

Electronic commerce (E-commerce) covers a wide range of businesses, from consumer based retail sites, through auction or music sites, to business exchanges trading goods and services between overseas corporations. As more and more businesses move sections of their operations onto the Internet, the boundaries between "conventional" and "electronic" commerce become increasingly blurred.

Like any digital technology or consumer-based purchasing platform, e-commerce has been evolving significantly over the past couple of years. As mobile devices such as smartphones and tablets became more popular and affordable, mobile commerce has become its own market and any mobile user may access to E-commerce directly. Accordingly, E-commerce provides huge benefits to their customers, for example, its around-the-clock availability, wide availability of goods and services, accessibility, and global reachability. Once the customers have ordered their goods or services online, they may receive their items without leaving their living space.

SUMMARY OF THE INVENTION

Without wishing to be bound by theory, the inventors, through their own research via trials and experimentation, have discovered that existing automation or robotics may not accommodate the daily business operations of the E-commerce warehouse. The turnover rates of goods or storage items in E-commerce warehouses are fast, while the goods are in small quantities but in vast varieties. For instance, the stored items and the boxes for packing these items are generally in irregular shapes, forms, colours and made of materials with different stiffness. Accordingly, it would be inefficient and slow to place the barcode or RFID labels to such objects and at worst, the barcode or RFID labels may be removed from the objects unintentionally during the logistic arrangements.

To solve or alleviate at least some of the above problems, the present invention discloses a system and a method for placing a label on an object. The system may comprise a scanning module and a robotic controlled apparatus. The scanning module may scan the object for a suitable label placement position based on predefined parameters associated with the label. On the other hand, the robotic controlled apparatus may first extract the label from a label substrate, move the label to be adjacent to the suitable label placement position, and finally apply the label onto the suitable label placement position such that the label is adhere to the object securely.

In accordance with a first aspect of the present invention, there is provided a system for placing a label on an object comprising: a scanning module arranged to scan the object for a suitable label placement position based on predefined parameters associated with the label; a robotic controlled apparatus arranged to extract the label from a label substrate and move the label to be adjacent to the suitable label placement position; and, wherein the robotic controlled apparatus is further arranged to apply the label onto the suitable label placement position such that the label is adhere to the object.

In one embodiment of the first aspect, attributes of the object is unknown before the object is scanned by the scanning module.

In one embodiment of the first aspect, the attributes of the object includes the object's size, shape, surface contours, functional orientation, material composition, deflection properties or any one or more thereof.

In one embodiment of the first aspect, the scanning module includes a camera arranged to capture an image of the object; and an object recognition processor arranged to identify an area on the surface of the object as the suitable label placement position.

In one embodiment of the first aspect, the robotic controlled apparatus includes a robotic member arranged to be actuated by a controller to extract the label from the label substrate and apply the label onto the suitable label placement position.

In one embodiment of the first aspect, the robotic member includes a pneumatic effector arranged to pneumatically extract the label from the label substrate and to pneumatically apply the label onto the object.

In one embodiment of the first aspect, the pneumatic effector is arranged to apply a pneumatically suction pressure to extract the label from the label substrate and; apply a pneumatically blow pressure to apply the label onto the object.

In one embodiment of the first aspect, the object recognition processor is arranged to identify edges of the object to identify generally planar areas on the object as suitable label placement position.

In one embodiment of the first aspect, the object is an item prepared for transportation.

In one embodiment of the first aspect, the system is further arranged to place labels on a plurality of objects moved by a conveyor belt system.

In accordance with a second aspect of the present invention, there is provided a method for placing a label on an object comprising the steps of: scanning the object for a suitable label placement position based on predefined parameters associated with the label; extracting the label from a label substrate and moving the label to be adjacent to the suitable label placement position; and applying the label onto the suitable label placement position such that the label is adhere to the object.

In one embodiment of the second aspect, attributes of the object is unknown before the object is scanned for the suitable label placement position.

In one embodiment of the second aspect, the attributes of the object includes the object's size, shape, surface contours, functional orientation, material composition, deflection properties or any one or more thereof.

In one embodiment of the second aspect, the step of scanning the object for the suitable label placement includes capturing an image of the object; and processing the image with an object recognition process to identify an area on the surface of the object as the suitable label placement position.

In one embodiment of the second aspect, the step of extracting the label from a label substrate and moving the label to be adjacent to the suitable label placement position includes actuating a robotic member to extract the label from the label substrate and applying the label onto the suitable label placement position.

In one embodiment of the second aspect, the robotic member includes a pneumatic effector arranged to pneumatically extract the label from the label substrate and to pneumatically apply the label onto the object.

In one embodiment of the second aspect, the pneumatic effector is arranged to apply a pneumatically suction pressure to extract the label from the label substrate and; apply a pneumatically blow pressure to apply the label onto the object.

In one embodiment of the second aspect, the object recognition process is arranged to identify edges of the object to identify generally planar areas on the object as suitable label placement position.

In one embodiment of the second aspect, the object is an item prepared for transportation.

In one embodiment of the second aspect, the method is further arranged to place labels on a plurality of objects moved by a conveyor belt system.

In accordance with a third aspect of the present invention, there is provided an effector for a robotic system comprising: an inlet arranged to receive fluid pressure; a fluid distribution medium arranged to be in communications with the inlet, wherein fluid pressure received by the inlet is isotropically distributed to the fluid communication medium such that the fluid communication medium can manipulate an object with the fluid pressure.

In one embodiment of the third aspect, the fluid distribution medium includes an object manipulation surface arranged to manipulate with the object.

In one embodiment of the third aspect, the fluid distribution medium is substantially surrounded by an air-tight wall arranged to cover the fluid distribution medium whilst exposing the object manipulation surface.

In one embodiment of the third aspect, the air-tight wall is malleable and/or flexible.

In one embodiment of the third aspect, the object manipulation surface is arranged to deliver a suction force to the object when the inlet receives a fluid pressure in a direction away from the inlet.

In one embodiment of the third aspect, the object manipulation surface is arranged to deliver a blowing force to the object when the inlet receives a fluid pressure in a direction towards the inlet.

In one embodiment of the third aspect, the suction force or blowing force is distributed isotropically across the object manipulation surface.

In one embodiment of the third aspect, the fluid communication medium is of a spongy characteristic.

In one embodiment of the third aspect, the air-tight wall is composed of a rubbery material.

In one embodiment of the third aspect, the effector is arranged to be connected to a fluid pressure delivery system In one embodiment of the third aspect, the effector is arranged to be connected to operate with a robotic arm arranged to direct the effector to an operating position adjacent to the object for manipulation.

In one embodiment of the third aspect, the object for manipulation is a label.

In one embodiment of the third aspect, the effector is arranged to extract the label from a label substrate when suction force is distributed across the object manipulation surface and to apply the label to an object surface when blowing force is distributed across the object manipulation surface.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
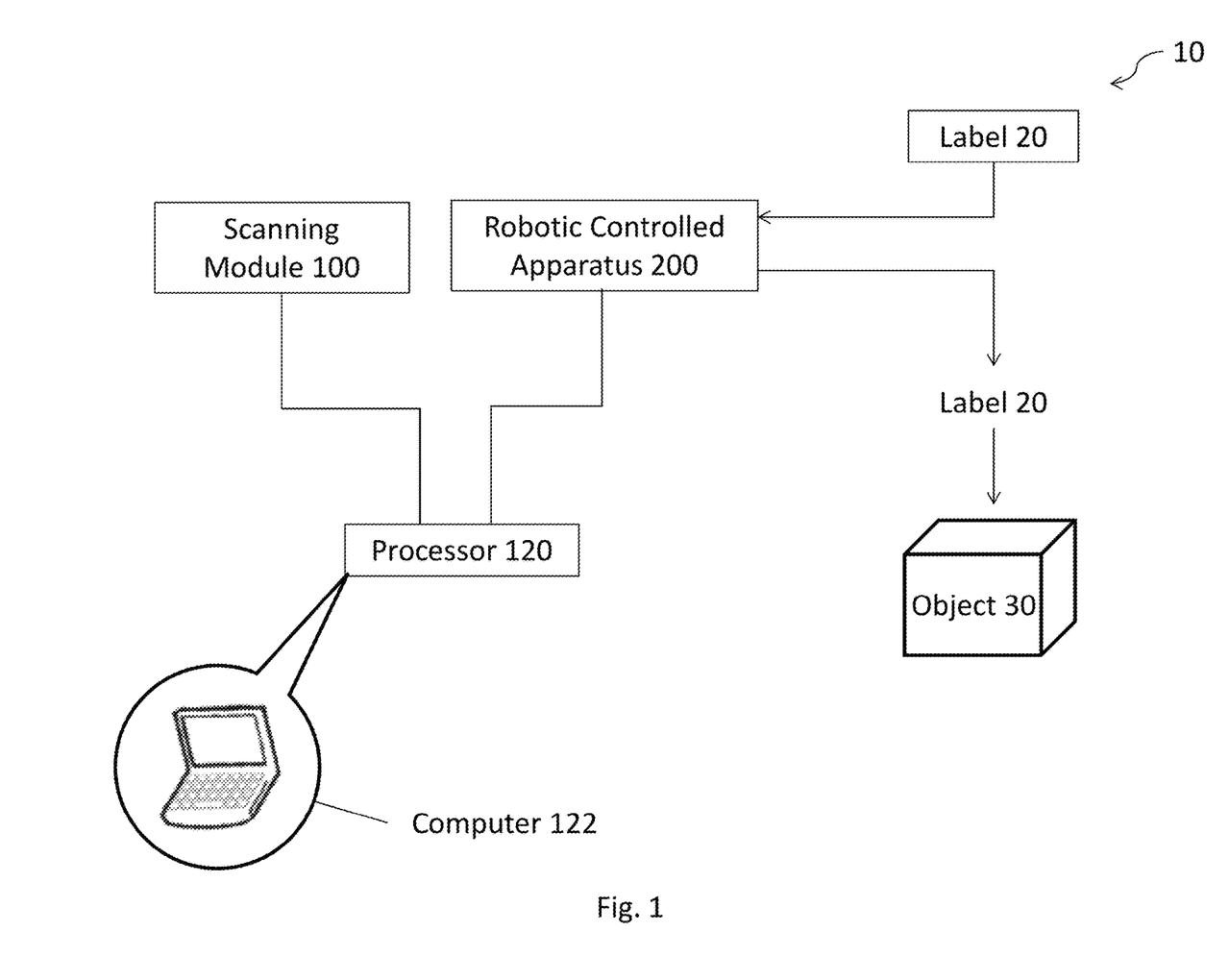
FIG. 1 shows a schematic view of a system in accordance with one embodiment of the present invention.

With reference to FIG. 1, there is provided a system 10 for placing a label 20 on an object 30 comprising: a scanning module 100 arranged to scan the object 30 for a suitable label placement position based on predefined parameters associated with the label 20; a robotic controlled apparatus 200 arranged to extract the label 20 from a label substrate 25 and move the label 20 to be adjacent to the suitable label placement position; and, wherein the robotic controlled apparatus 200 is further arranged to apply the label 20 onto the suitable label placement position such that the label 20 is adhere to the object 30.

In this embodiment, the system 10 includes a scanning module 100, a robotic controlled apparatus 200, a target object 30 to be scanned by the scanning module 100, a label 20 for affixing on the scanned object 30, e.g. barcode, RFID labels, or any other identifications with delivery address or other stored information, and a label substrate 25 e.g. an auto label dispenser 25 for providing labels 20. The attributes of the object 30, such as the object's size, shape, surface contours, functional orientation, material composition, stiffness, deflection properties or the like are unknown before the object 30 is scanned by the scanning module 100.

Figure 2:
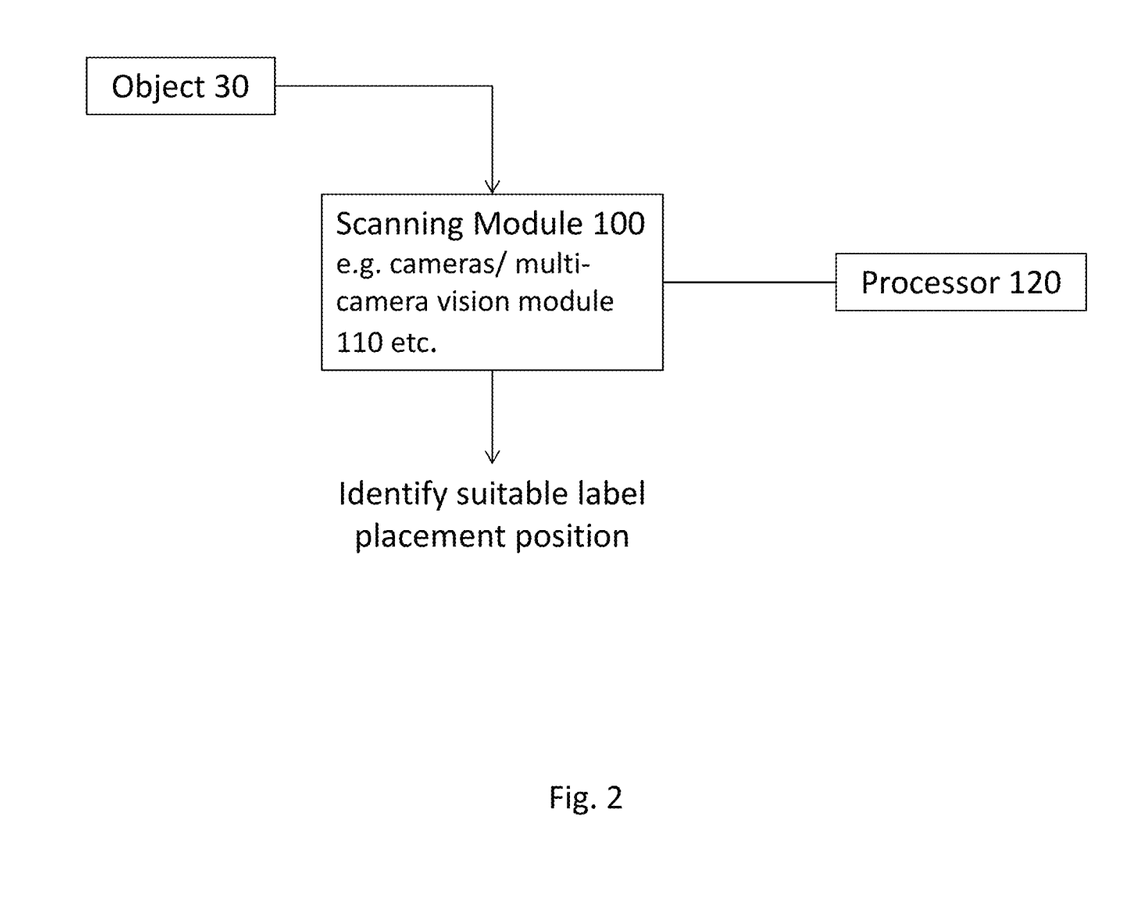
FIG. 2 is a schematic view showing a scanning module of the system in FIG. 1.

Preferably, the scanning module 100 further includes a camera 110 or a multi-camera vision module 110 and an object recognition processor 120, such as a computer 122, as shown in FIG. 2. The camera 110 is arranged to capture an image of the object 30, while the object recognition processor 120 is arranged to identify an area on the surface of the object 30 as the suitable label placement position, for example a 4 inch×1.75 inch area. In one example embodiment, such suitable label placement position may be a planar region or surface of an object 30 with irregular shape. A label 20, with any arbitrary shapes, may then be applied onto this suitable label placement position and uniformly affixed onto the object 30, thereby assigning a unique identification to the object 30.

Optionally, the multi-camera vision module 110 may further include a stereo camera 112 (not shown) and a time-of-flight camera/an IR pattern sensor 114 (not shown)

to facilitate the image capturing of the object 30 from various orientations, thereby identifying the most suitable label placement position among the multi-planes of a three dimensional object 30 more efficiently. For instance, the stereo camera 112 and the time-of-flight camera/IR pattern sensor 114 may further provide the location of the object 30, for example the depth information to the object recognition processor 120, such that the relative position of the object 30 may be tracked timely and accurately even if the object 30 is under an arbitrary, unpredictable non-uniform motion.

Figure 3:
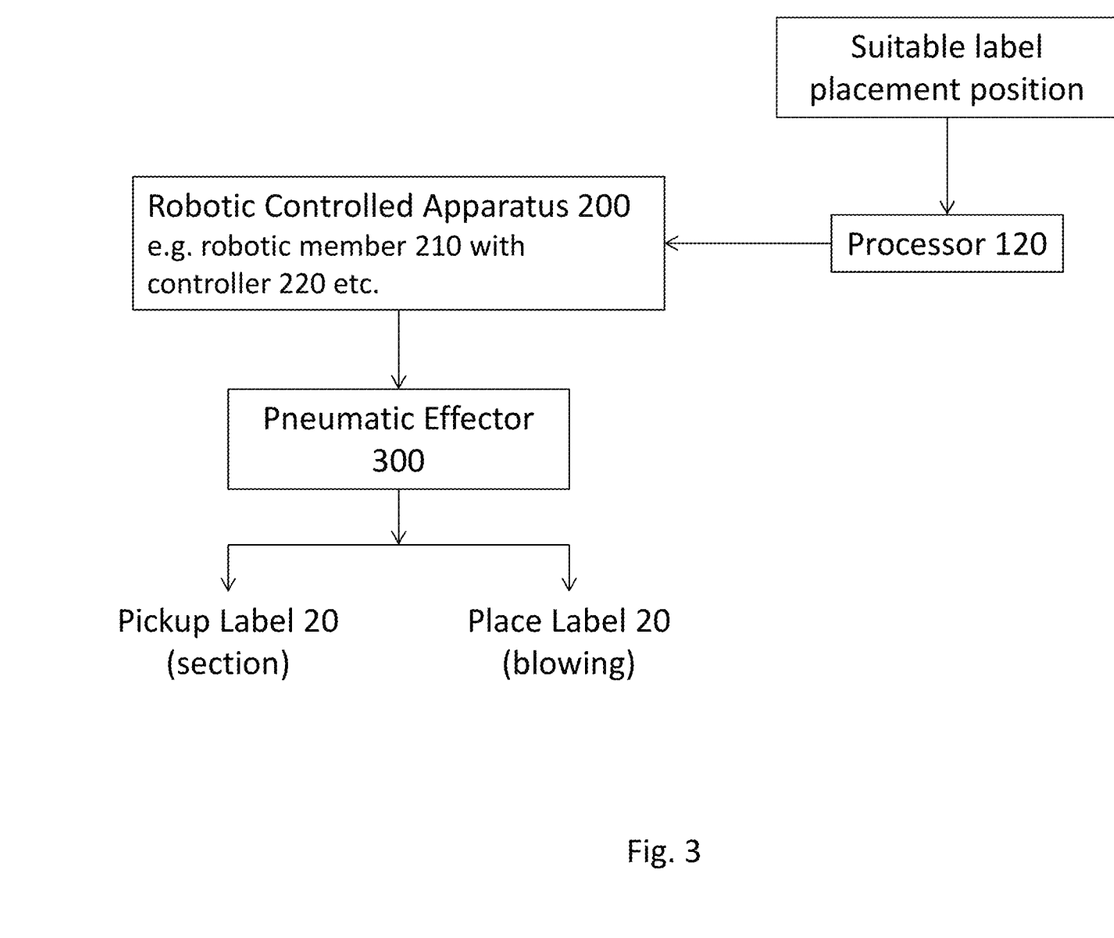
FIG. 3 is a schematic view showing a robotic controlled apparatus of the system in FIG. 1.

On the other hand, the robotic controlled apparatus 200 may include a robotic member 210, e.g. an industrial arm such as Delta robot or Cartesian robot, and a controller 220 e.g. a microcontroller with embedded applications for manipulating the motion of the robotic member 210 in three dimensions space, based on the programmable input/output and data algorithms. The robotic member 210, actuated by the controller 220, may extract the label 20 from the label substrate 25 and apply the label 20 onto the suitable label placement position. For instance, the robotic member 210 may include a pneumatic effector 300 arranged to pneumatically extract/pick up the label 20 from the label substrate 25 through suctioning, by applying a pneumatically suction pressure, and pneumatically apply/place the label 20 onto the object 30 through blowing, by applying a pneumatically blow pressure, as shown in FIG. 3. Alternatively, the label 20 may be rolled onto the object 30 with a moveable end effector 30.

Preferably, the object recognition processor 120 may identify the edges of the object 30, in order to identify the generally planar areas on the object 30 as suitable label placement position. As the attributes of the object 30, such as the object's size, shape, surface contours, functional orientation, material composition, deflection properties or the like, are unknown, it is advantageous to identify the planar areas on the object 30, thereby choosing the most suitable label placement position, for example, the position with the largest planar area available.

Figure 4:
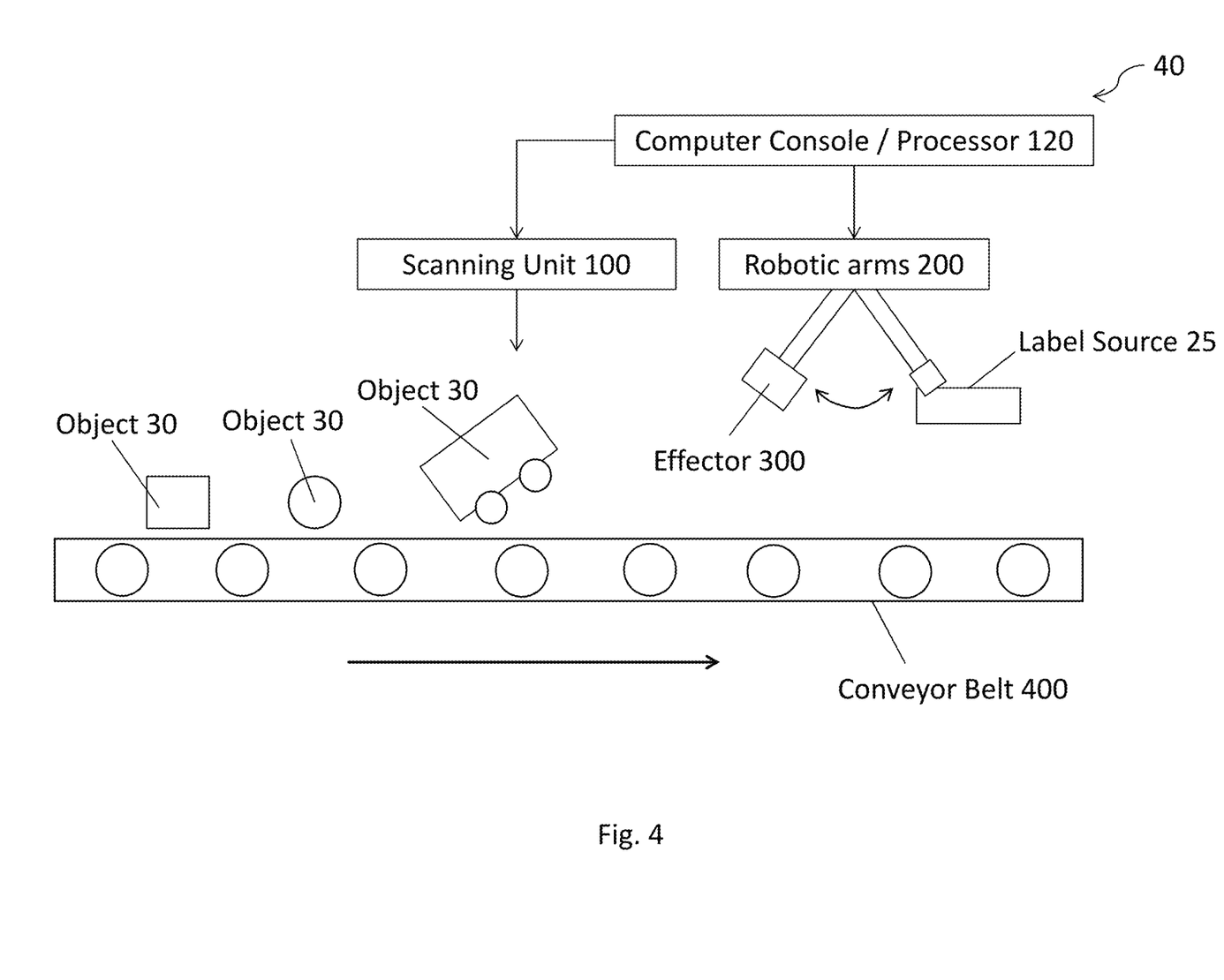
FIG. 4 shows a schematic view of a system in accordance with one alternative embodiment of the present invention.

In one alternative embodiment, there is provided a system 40 for placing a label 20 on an object 30, such as the item 40 prepared for transportation along a transportation system 400, for example a conveyor belt system 400 for transporting luggage as shown in FIG. 4. The system 10 is preferably provided a scanning unit 100, a robotic arm 200, and a computer console/processor 120 for controlling the scanning unit 100 and the robotic arm 200. In this system 40, a large volume of objects 30 with irregular shapes, forms, colours and made of materials with different stiffness are being transported along the conveyor belt system 400.

Preferably, the scanning unit 100 is arranged to scan each of the plurality of objects 30 moved by the conveyor belt system 400 along the conveyor belt, for example by capturing the images of the object 30 with camera 110 for suitable label placement position and based on predefined parameters associated with a plurality of labels 20. The captured images may be sent to the computer console 120 for image analysis and object recognition. In one example embodiment, the object recognition processor 120 may identify the edges of the irregular object 30, for example, by using edge detection technique in order to identify the generally planar areas on the object 30, and thence selecting the most suitable planar area e.g. the largest planar area available as the suitable label placement position. Alternatively, the suitable label placement position may be determined based on other user-predefined criteria, e.g. the shape of the label 20 apart from the size of the planar area or in addition to the size of the planar area.

The robotic arm 200, commanded by the computer console 120, is arranged to extract each of the labels 20 from a label source 25 and move the labels 20 to be adjacent to the suitable label placement position of each of the scanned object 30. Optionally, the speed of the conveyor belt may be monitored and adjusted by the computer console 120, thereby allowing the objects 30 to be sufficiently separated.

The robotic arm 200 is further arranged to apply each of the labels 20 onto the suitable label placement positions, such that each of the labels 20 may adhere to and placed on the plurality of the objects 30 respectively. Optionally, the labels 20 may be placed on the objects by the robotic arm 200 with the aiding of an effector 300 attached thereto. It would be appreciated by person skilled in the art that the system 40 may also be implemented in a transportation system comprising a plurality of conveyor belt systems 400.

Turning now to the "hand" and "eye" coordination between the scanning module 100 and the robotic controlled apparatus 200, the angular positions and movement of the robotic member 210 may be derived from the coordination system based on the positions of the, label 20, object 30 and also the initial position of the robotic member 210, with the following expression:—

$$\Lambda_{coeff} \begin{bmatrix} X \\ Y \\ Z \\ 1 \end{bmatrix} \Rightarrow \begin{bmatrix} X' \\ Y' \\ Z' \\ 1 \end{bmatrix} \Rightarrow J^{-1} \begin{bmatrix} \theta_1 \\ \theta_2 \\ \theta_3 \\ 1 \end{bmatrix}$$

Figure 5A:
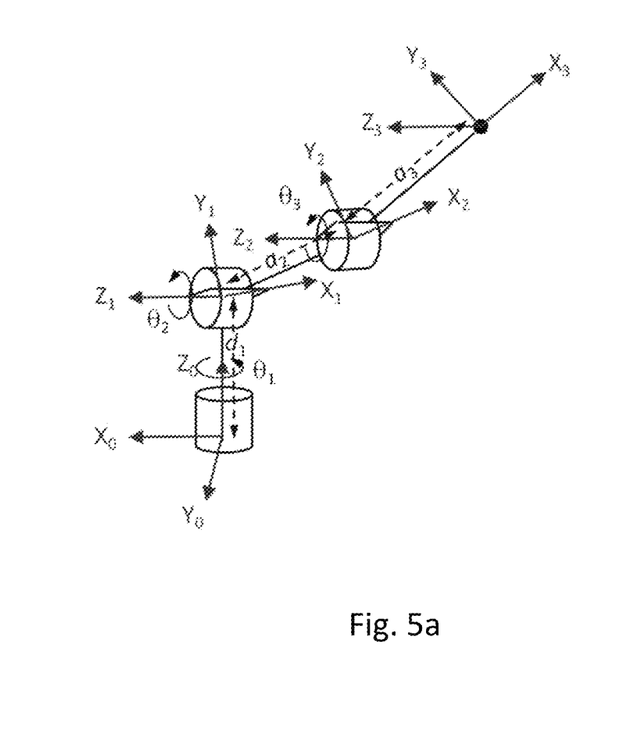
FIG. 5a shows a kinetic chain of a robotic arm with an end-effector in accordance with yet another embodiment.
Figure 5B:
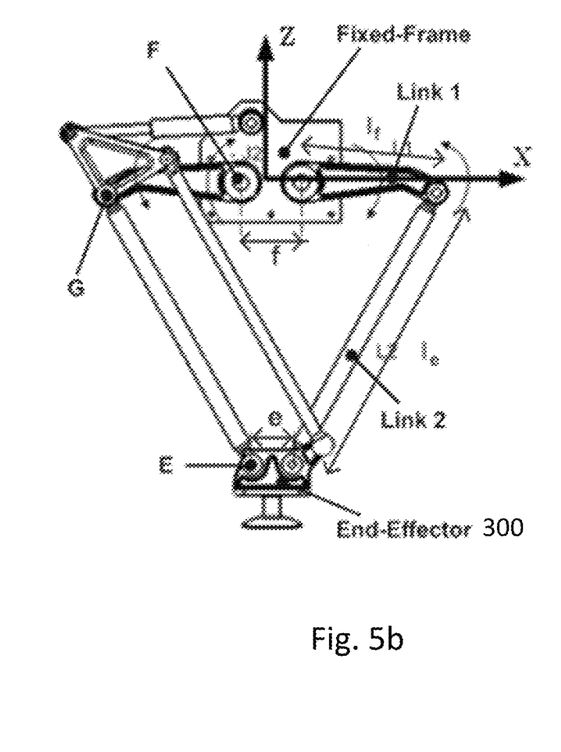
FIG. 5b is a schematic view showing the construction of a robotic arm with an end-effector in accordance with yet another embodiment.

As shown in FIGS. 5a to 5b, a coordinate frame is attached to each link of the effector 300, where each of the links are provided with the link parameters as shown in Table 1 below:—

| Link | $\Theta_i$ | $d_i$ | $a_i$ | $\alpha_i$ |
|------|------------|-------|-------|------------|
| 1 | $\Theta_1$ | $d_1$ | 0 | 90° |
| 2 | $\Theta_2$ | 0 | $a_2$ | 0 |
| 3 | $\Theta_3$ | 0 | $a_3$ | 0 |

Figure 6:
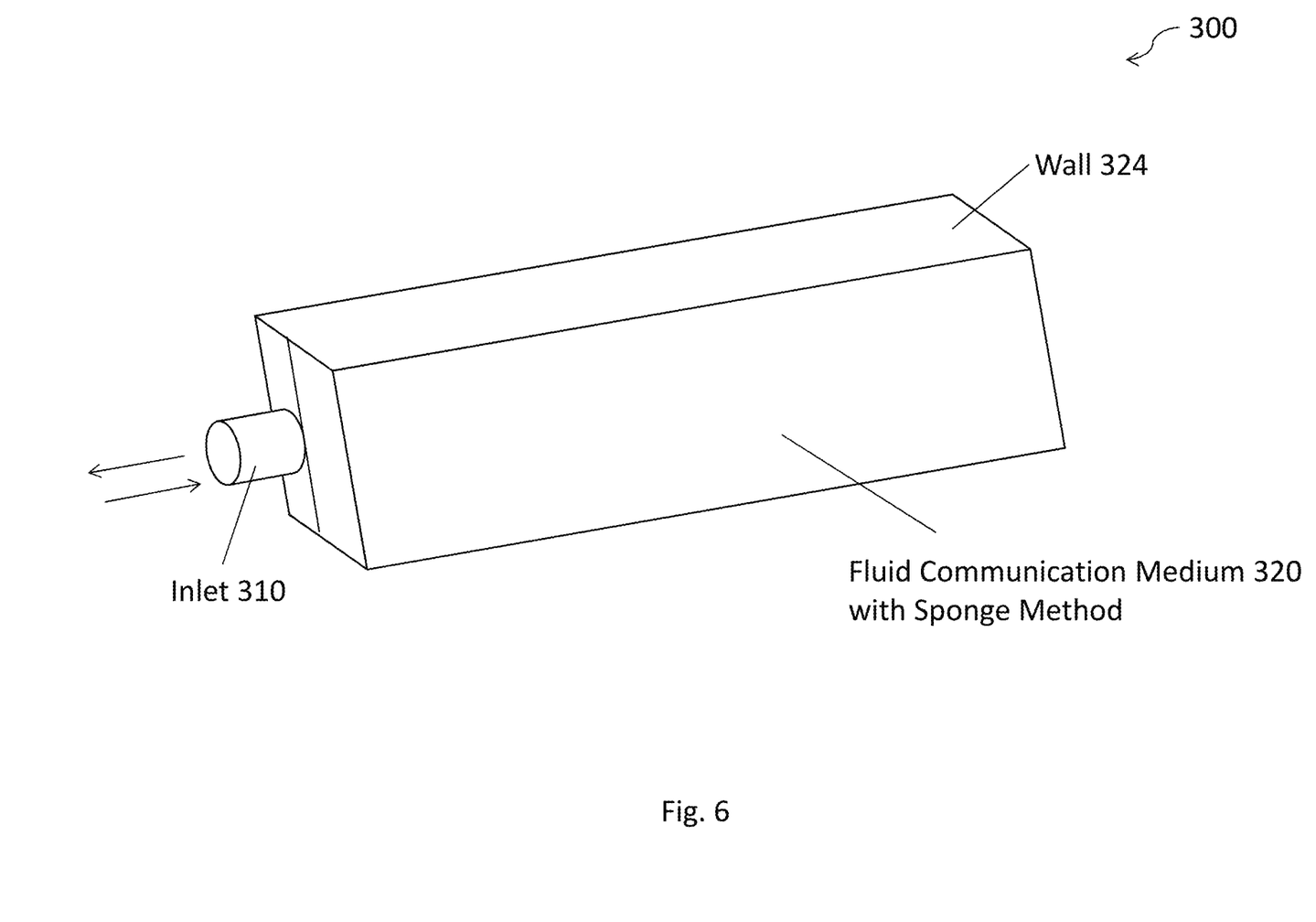
FIG. 6 is a schematic view of an effector in accordance with one embodiment of the present invention.
Figures 7A, 7B, 7C:
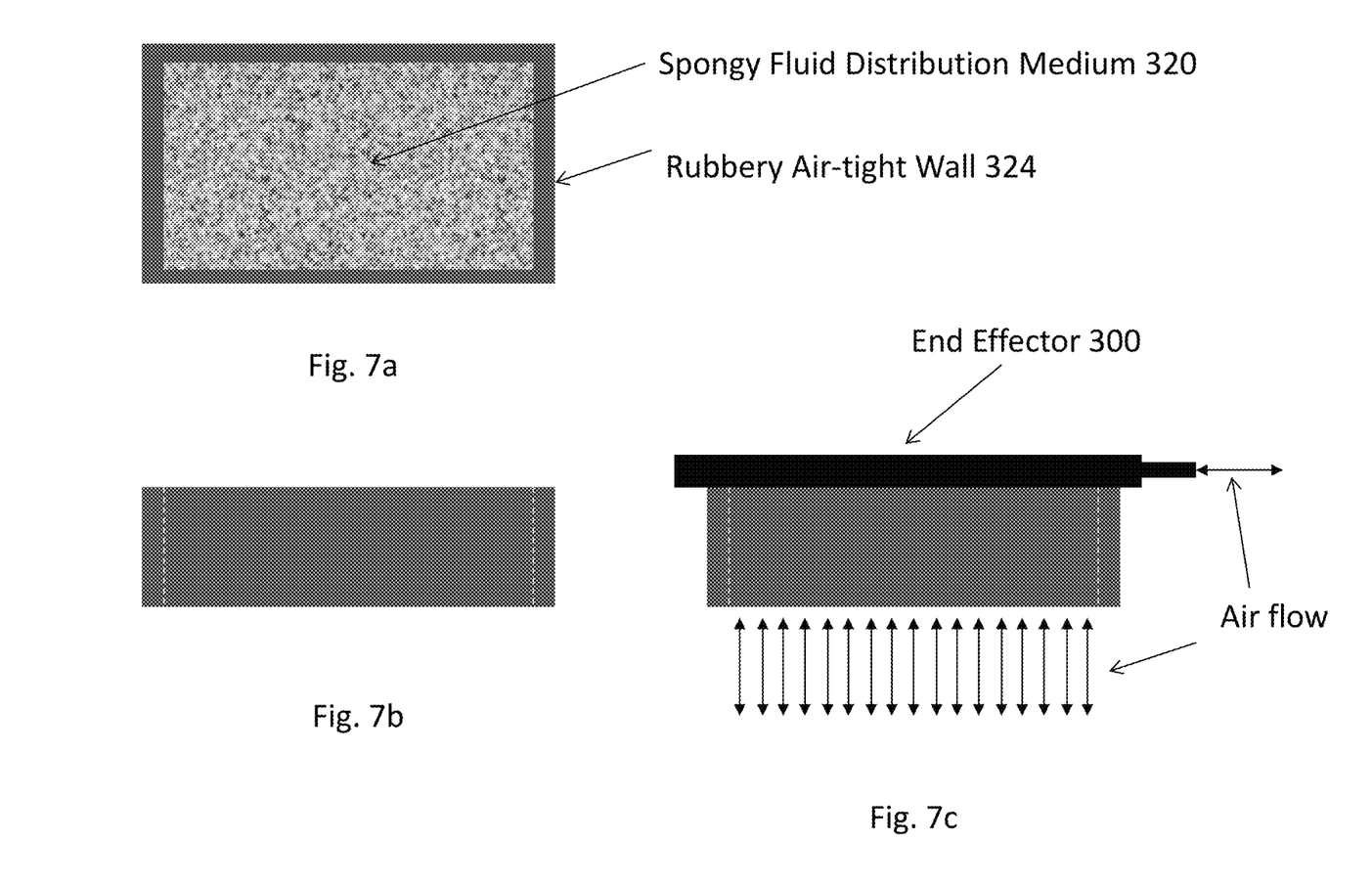
FIG. 7a shows the top view of the effector in FIG. 6.
FIG. 7b shows the partial side view of the effector in FIG. 6.
FIG. 7c shows the side view of the effector in FIG. 6.

With reference to FIG. 6, there is provided an effector 300 for a robotic system 10 comprising: an inlet 310 arranged to receive fluid pressure; a fluid distribution medium 320 arranged to be in communications with the inlet 310, wherein fluid pressure received by the inlet 310 is isotropically distributed to the fluid communication medium 320 such that the fluid communication medium 320 can manipulate an object 30 with the fluid pressure.

In this embodiment, the fluid distribution medium 320, preferably with a spongy characteristic, may include an object manipulation surface 322 arranged to manipulate the object 30 underneath, and a malleable and/or flexible airtight wall 324, e.g. composed of a rubbery material, may be arranged to cover the fluid distribution medium 320. Preferably, the fluid distribution medium 320 is substantially surrounded by the air-tight wall 324 whilst exposing the object manipulation surface 322. The object manipulation surface 322, being surrounded by the rubbery air-tight wall 324, may provide an air flow isotropically through the spongy fluid distribution medium 320. Advantageously, the object manipulation surface 322 may conform to the surface of the object 30 underneath upon contacting, while the air-tight wall 324 may be held in place to prevent from any air leakage therebetween.

Preferably, the force applied to the object 30 may be manipulated by the directions of the fluid pressure received by the inlet 310, thereby manipulating the pick and place automation of the object 30. For instance, the object manipulation surface 322 may be arranged to deliver a suction force to the object 30 when the inlet 310 receives a fluid pressure in a direction away from the inlet 310, or alternatively, deliver a blowing force to the object 30 when the inlet 310 receives a fluid pressure in a direction towards the inlet 310. Advantageously, the suction force or blowing force may be distributed isotropically across the object manipulation surface 322, such that the label 20 may be picked from the label substrate 25 and placed onto the surface of the irregular object 30 efficiently.

In one alternative embodiment, the effector 300 may be connected to a fluid pressure delivery system 500 for suck and blow actuation, and a robotic arm 210 for automation. The effector 300, by cooperating with the robotic arm 210 arranged to direct the effector 300 to an operating position adjacent to the object for manipulation, for example, a label 20.

Upon receiving a first fluid pressure, for example a fluid pressure in a direction away from the inlet 310 from the fluid pressure delivery system 500 through the inlet 310, the effector 300 may extract the label 20 from a label substrate 25 when suction force is distributed across the object manipulation surface 322. Upon receiving a second fluid pressure, for example a fluid pressure in a direction towards the inlet 310 from the fluid pressure delivery system 500 through the inlet 310, the effector 300 may apply the label 20 evenly onto an object with uneven surface when blowing force is distributed across the object manipulation surface 322.

It will be appreciated by persons skilled in the art that although the embodiments comprising the system 10/40 or the effector 300 are applied to affixing labels on multiple and irregular objects, these embodiments may also be applied in any other applications such as pick and place automations in warehouse, airport, outdoor gaming, logistics, food and beverage ordering, manufacturing process or the like with minor modifications and without departing from the concept of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for placing a label on an object comprising:
   a scanning module arranged to scan the object for a suitable label placement position based on predefined parameters associated with the label;
   a robotic controlled apparatus arranged to extract the label from a label substrate and move the label to be adjacent to the suitable label placement position; and, wherein the robotic controlled apparatus is further arranged to apply the label onto the suitable label placement position such that the label adheres to the object;
   wherein attributes of the object are unknown before the object is scanned by the scanning module, and wherein the attributes of the object include the object's shape;
   wherein the robotic controlled apparatus includes a pneumatic effector arranged to be actuated by a controller so as to pneumatically extract the label from the label substrate and to pneumatically apply the label onto the object; and
   wherein the pneumatic effector comprises an inlet arranged to receive fluid pressure and a spongy fluid distribution medium defining an object manipulation surface in fluid communication with the inlet via the spongy fluid distribution medium, and the pneumatic effector further comprises a malleable and flexible air-tight wall surrounding the object manipulation surface and covering the fluid distribution medium whilst exposing the object manipulation surface,
   wherein the fluid pressure received by the inlet is isotopically distributed to the spongy fluid distribution medium such that the spongy fluid distribution medium can manipulate the label on the object manipulation surface with the fluid pressure,
   wherein the object manipulation surface is arranged to conform to the label and the object upon contact and to provide an air flow through the spongy fluid distribution medium, so as to facilitate applying the label evenly onto the object underneath the object manipulation surface with an uneven surface or an irregular shape while the air-tight wall is held in place to prevent from any air leakage between the spongy fluid distribution medium and the surface of the object.

2. The system for placing a label on an object in accordance with claim 1, wherein the attributes of the object further include the object's size, surface contours, functional orientation, material composition, deflection properties or any one or more thereof.

3. The system for placing a label on an object in accordance with claim 2, wherein the scanning module includes a camera arranged to capture an image of the object; and an object recognition processor arranged to identify an area on a surface of the object as the suitable label placement position.

4. The system for placing a label on an object in accordance with claim 3, wherein the pneumatic effector is arranged to apply a pneumatically suction pressure to extract the label from the label substrate and the method further includes:
   applying a pneumatically blow pressure to apply the label onto the object.

5. The system for placing a label on an object in accordance with claim 4, wherein the object recognition processor is arranged to identify edges of the object to identify a generally planar area on the object as the suitable label placement position.

6. The system for placing a label on an object in accordance with claim 1, wherein the object is an item prepared for transportation.

7. The system for placing a label on an object in accordance with claim 1, wherein the system is further arranged to place labels on a plurality of objects moved by a conveyor belt system.

8. A method for placing a label on an object comprising the steps of:
   scanning the object for a suitable label placement position based on predefined parameters associated with the label;
   extracting the label from a label substrate by actuating a robotic member and moving the label to be adjacent to the suitable label placement position; and
   applying the label onto the suitable label placement position by further actuating the robotic member such that the label adheres to the object;

wherein attributes of the object are unknown before the object is scanned by the scanning module, and wherein the attributes of the object include the object's shape;

wherein the robotic member includes a pneumatic effector arranged to be actuated by a controller so as to pneumatically extract the label from the label substrate and to pneumatically apply the label onto the object; and wherein the pneumatic effector comprises an inlet arranged to receive fluid pressure and a spongy fluid distribution medium defining an object manipulation surface in fluid communication with the inlet via the spongy fluid distribution medium, and the pneumatic effector further comprises a malleable and flexible air-tight wall surrounding the object manipulation surface and covering the fluid distribution medium whilst exposing the object manipulation surface, wherein the fluid pressure received by the inlet is isotopically distributed to the spongy fluid distribution medium such that the spongy fluid distribution medium can manipulate the label on the object manipulation surface with the fluid pressure, wherein the object manipulation surface is arranged to conform to the label and the object upon contact and to provide an air flow through the spongy fluid distribution medium, so as to facilitate applying the label evenly onto the object underneath the object manipulation surface with an uneven surface or an irregular shape, while the air-tight wall is held in place to prevent from any air leakage between the spongy fluid distribution medium and the surface of the object.

9. The method for placing a label on an object in accordance with claim 8, wherein the attributes of the object further include the object's size, surface contours, functional orientation, material composition, deflection properties or any one or more thereof.

10. The method for placing a label on an object in accordance with claim 9, wherein the step of scanning the object for the suitable label placement includes:

capturing an image of the object; and processing the image with an object recognition process to identify an area on the surface of the object as the suitable label placement position.

11. The method for placing a label on an object in accordance with claim 10, wherein the pneumatic effector is arranged to apply a pneumatically suction pressure to extract the label from the label substrate, and the method further includes:

applying a pneumatically blow pressure to apply the label onto the object.

12. The method for placing a label on an object in accordance with claim 11, wherein the object recognition process is arranged to identify edges of the object to identify a generally planar area on the object as the suitable label placement position.

13. The method for placing a label on an object in accordance with claim 8, wherein the object is an item prepared for transportation.

14. The method for placing a label on an object in accordance with claim 8, wherein the method is further arranged to place labels on a plurality of objects moved by a conveyor belt system.

15. An effector for placing a label on an object using a robotic system comprising:

an inlet arranged to receive fluid pressure;

a spongy fluid distribution medium defining an object manipulation surface in fluid communication with the inlet via the spongy fluid distribution medium, and a malleable and flexible air-tight wall surrounding the object manipulation surface and covering the fluid distribution medium whilst exposing the object manipulation surface;

wherein fluid pressure received by the inlet is isotropically distributed to the spongy fluid distribution medium such that the spongy fluid distribution medium can manipulate a label on the object manipulation surface with the fluid pressure;

wherein the object manipulation surface is arranged to conform to the label and the object upon contact and to provide an air flow through the spongy fluid distribution medium, so as to facilitate applying the label evenly onto the object underneath the object manipulation surface with an uneven surface or an irregular shape while the air-tight wall is held in place to prevent from any air leakage between the spongy fluid distribution medium and the surface of the object.

16. The effector in accordance with claim 15, wherein the object manipulation surface is arranged to deliver a suction force to the label when the inlet receives a fluid pressure in a direction away from the inlet.

17. The effector in accordance with claim 16, wherein the object manipulation surface is arranged to deliver a blowing force to the label when the inlet receives a fluid pressure in a direction towards the inlet.

18. The effector in accordance with claim 17, wherein the suction force or the blowing force is distributed isotropically across the object manipulation surface.

19. The effector in accordance with claim 15, wherein the air-tight wall is composed of a rubbery material.

20. The effector in accordance with claim 15, wherein the effector is arranged to be connected to a fluid pressure delivery system.

21. The effector in accordance with claim 15, wherein the effector is arranged to be connected to operate with a robotic arm arranged to direct the effector to an operating position adjacent to the label.

22. The effector in accordance with claim 15, wherein the effector is arranged to extract the label from a label substrate when a suction force is distributed across the object manipulation surface and to apply the label to a surface when a blowing force is distributed across the object manipulation surface.

23. The effector in accordance with claim 16, wherein the suction force is distributed isotropically across the object manipulation surface.

* * * * *

UNITED STATES PATENT AND TRADEMARK OFFICE
CERTIFICATE OF CORRECTION

PATENT NO. : 11,352,161 B2
APPLICATION NO. : 16/346253
DATED : June 21, 2022
INVENTOR(S) : Ka Lun Fan and Wai Ming Edwin Cheung It is certified that error appears in the above-identified patent and that said Letters Patent is hereby corrected as shown below:

In the Claims

Claim 1, at Column 8, Lines 13-14 is amended to read as follows:
"wherein the fluid pressure received by the inlet is isotropically distributed to the spongy fluid distribution"

Claim 8, at Column 9, Lines 17-18 is amended to read as follows:
"wherein the fluid pressure received by the inlet is isotropically distributed to the spongy fluid distribution"

Signed and Sealed this
Fourth Day of October, 2022

Katherine Kelly Vidal
*Director of the United States Patent and Trademark Office*